United States Patent

[11] 3,596,986

| [72] | Inventor | La Verne B. Ragsdale<br>Troy, Mich. |
|---|---|---|
| [21] | Appl. No. | 23,919 |
| [22] | Filed | Mar. 30, 1970 |
| [45] | Patented | Aug. 3, 1971 |
| [73] | Assignee | General Motors Corporation<br>Detroit, Mich. |

[54] BABY SEAT
3 Claims, 4 Drawing Figs.

[52] U.S. Cl. .................................................. 297/183,
297/250, 297/389, 297/457, 297/DIG. 2
[51] Int. Cl. ............................................... A47d 1/10
[50] Field of Search .......................................... 297/250,
457, DIG. 2, 254, 452, 253, 384, 390, 385, 183,
377, 255, 256, 152, 389

[56] References Cited
UNITED STATES PATENTS

| 2,711,786 | 6/1955 | Weiss | 297/DIG. 2 |
| 2,930,430 | 3/1960 | Bloom | 297/DIG. 2 |
| 3,115,366 | 12/1963 | Glass | 297/421 |
| 3,206,247 | 9/1965 | Johnson | 297/254 |
| 3,325,213 | 6/1967 | Levy | 297/250 |

*Primary Examiner*—Francis K. Zugel
*Assistant Examiner*—Darrell Marquette
*Attorneys*—J. L. Carpenter and E. J. Biskup ABSTRACT: A baby seat including an outer shell member and an inner shell member formed of a plastic material and fastened together so as to make a rigid unitary member. The baby seat is portable and is adapted to be used in a vehicle, in which case it rests on the passenger seat with the baby facing rearwardly. Suitable openings are provided in the baby seat for permitting the vehicle seatbelt to serve as a means for holding the baby seat in place.

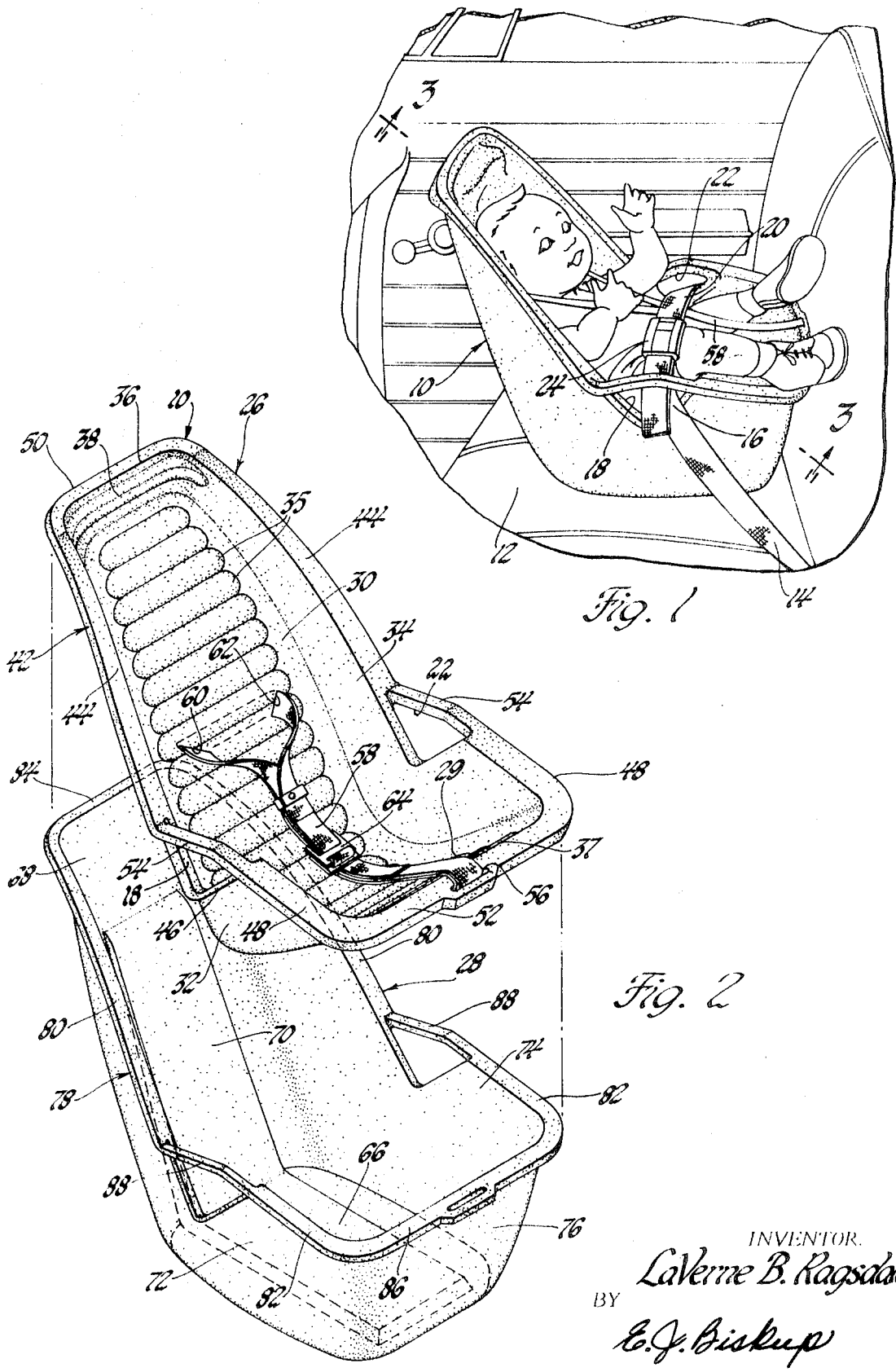

INVENTOR.
LaVerne B. Ragsdale
BY
E. J. Biskup
ATTORNEY

BABY SEAT

The invention concerns a seat and more particularly a seating arrangement which can be utilized for supporting a baby in a sitting position. The seat is made from a plastic material and is portable in nature so as to permit it to be utilized at home or in a vehicle for maintaining the baby in a slightly reclined sitting position. The seat is made in two parts consisting of an outer shell member and an inner shell member, both of which are bonded together so as to form a rigid unitary structure. The inner shell member is located within the outer shell member and, in the preferred form has a back portion, a seat portion and a pair of laterally spaced V-shaped side portions for supporting a baby. The outer shell member has a generally rectangular base which can rest on a seat cushion or any generally horizontal support platform so as to provide a stable support for the inner shell. In addition, the base portion includes an inclined rear wall and an upstanding front wall, both of which are joined together by a pair of laterally spaced sidewalls. Both the inner and outer shell members have the peripheral edge thereof formed with an outwardly extending flange which serves as the bonding means for securing the shell members together.

The objects of the present invention are to provide a seat structure permitting a baby to rest in a sitting reclined position; to provide a two-piece plastic baby seat in which one part is utilized for supporting a baby in a sitting reclined position while the other part serves as a base, the lower portion of which is coextensive with a major part of the seating portion so as to provide increased stability for the baby seat when the latter is resting on a flat surface; to provide a baby seat which can rest on the seat cushion of a vehicle passenger seat and includes suitable provisions for permitting the usual seatbelt to act as a restraining means for holding the baby seat in a secured position; to provide a baby seat which is molded from a plastic material and has a back portion provided with a plurality of transverse ribs which serve as cushioning means for the baby; and to provide a baby seat which is generally V-shaped in longitudinal cross section and includes a pair of laterally spaced handles which span the sidewalls and are integrally formed therewith for facilitating movement of the baby seat.

Other objects and advantages of the present invention will be apparent from the following detailed description when taken with the drawings in which:

FIG. 1 shows a baby seat made in accordance with the invention and secured in position on the seat cushion of a motor vehicle;

FIG. 2 is an exploded perspective view showing the two parts of the seat construction which make up the baby seat of FIG. 1;

Figure 3:
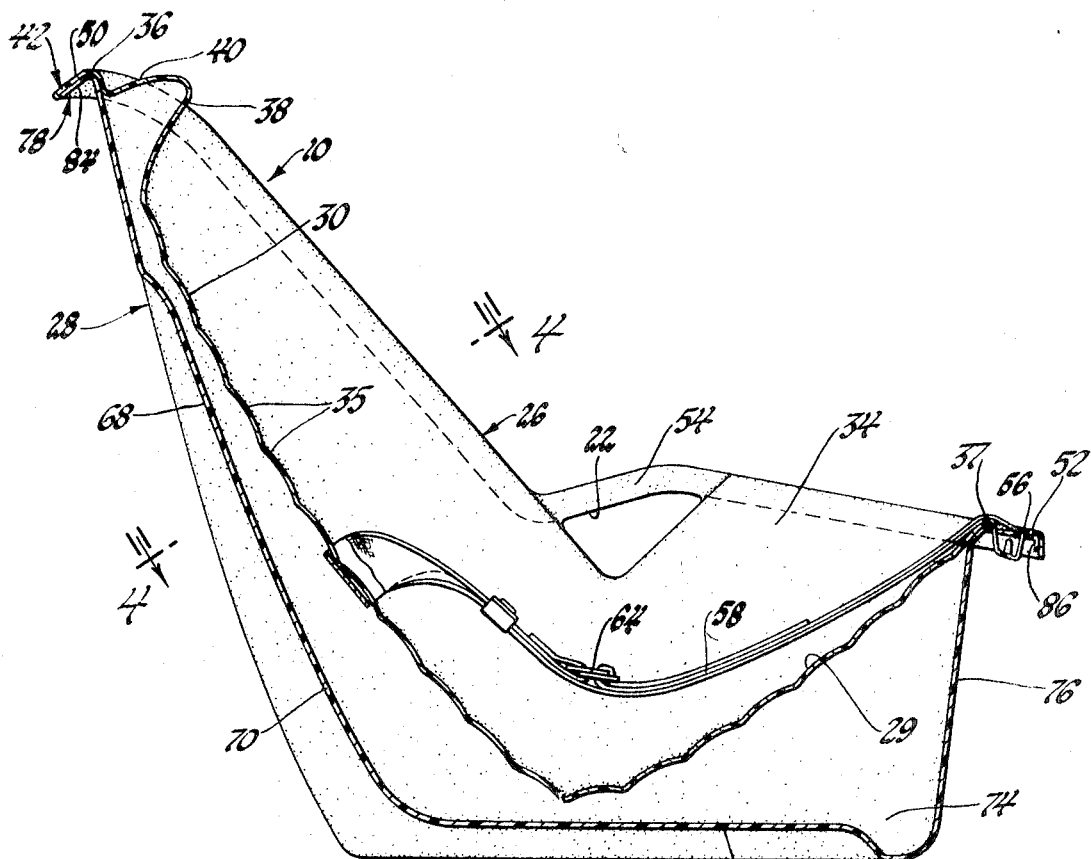
FIG. 3 is an enlarged cross-sectional view taken on line 3–3 of FIG. 1.

Referring to the drawings and more specifically FIG. 1 thereof, the baby seat 10 made in accordance with the invention is shown resting on the seat cushion 12 of a vehicle seat. The usual seat or lap belt 14 found in vehicles has one end 16 thereof passing through an opening 18 adjacent one side of the baby seat 10, while the other end 20 of the seatbelt 14 passes through an opening 22 adjacent the other side of the baby seat 10. As seen, both ends 16 and 20 of the seatbelt 14 are fastened together through a suitable adjustable latch means 24 which serves as a restraining means for maintaining the baby seat 10 in a fixed position in the event that the vehicle may be subjected to excessive deceleration forces.

As seen in FIG. 2, the baby seat 10 in general consists of an inner shell member 26 and an outer shell member 28, each of which is independently made by a molding process or otherwise from a lightweight plastic material such as polypropylene. The inner shell member 26 serves as the seating area of the baby seat 10 and includes a seat portion 29, back portion 30, and a pair of laterally spaced V-shaped side portions 32 and 34. Both the seat portion 29 and back portion 30 have a plurality of transverse ribs 35 molded therein for providing resiliency to the body contact area of the inner shell member 26. It will be noted that the back portion 30 at its upper edge 36 is of a lesser transverse dimension than the seat portion 29 at the free edge 37 thereof. As a result, the transverse length of the ribs 35 starting from the upper part of the back portion 30 progressively increases to a maximum dimension at the free edge 37 of the seat portion 29. Moreover, as seen in FIG. 3, the ribs 35 terminate adjacent the upper end of the back portion 30 where an outwardly extending headshield 38 is formed with a reversely bent leg 40. An outwardly extending continuous flange 42 is integrally formed along the circumference of the entire inner shell member 26. The flange 42 comprises flange sections 44, 46 and 48 along each side portion 32 and 34 of the inner shell member 26 as well as a flange section 50 at the upper transverse edge 36 of the back portion 30 and a flange section 52 at the transverse free edge 37 of the seat portion 29. Thus, as seen in FIG. 2, the flange 42 encompasses the entire shell member at the peripheral edge thereof and serves as reinforcing means for providing increased rigidity to the seating area of the baby seat 10. The flange sections 44 along the side portions 32 increase in width as they extend downwardly from the upper edge 36 of the back portion 30 so as to provide sufficient space for the formation of a crossbar 54 which joins the flange sections 44 and 48 and serves as a handle for carrying the baby seat 10.

The flange section 52 adjacent the free edge 37 of the seat portion is enlarged at an intermediate portion thereof and has a transverse slot 56 formed therethrough which accommodates one end of a shoulder belt 58. The shoulder belt 58 is looped through two angularly inclined slots 60 and 62 formed in the back portion 30 and serves as a means for holding the baby within the inner shell member. 26. A buckle 64 is provided for interconnecting the free ends of the shoulder belt and for adjusting the length thereof depending upon the size of the baby.

Figure 4:
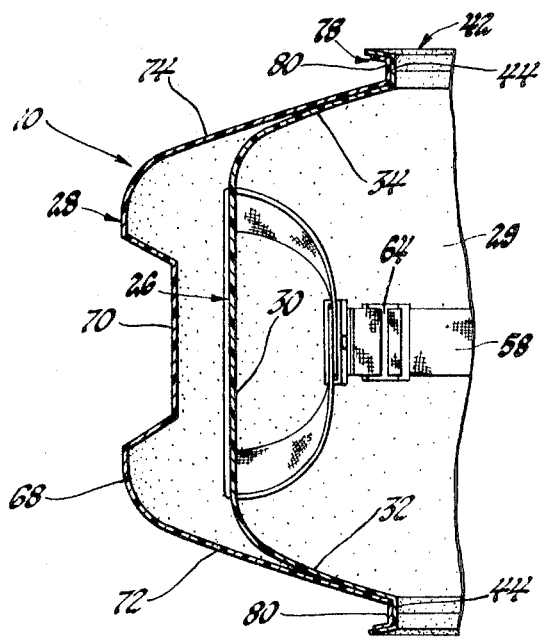
FIG. 4 is a fragmentary sectional view taken on lien 4–4 of FIG. 3.

As aforementioned, the outer shell member 28 serves as a base for supporting the inner shell member 26 in the position seen in FIGS. 1 and 3. In this connection, it will be noted that the outer shell member 28 comprises a generally rectangular base portion 66 which has the rear thereof integrally formed with an upstanding and rearwardly inclined rear wall 68. An elongated rib 70 is formed in the base portion 66 and the rear wall 68 along the longitudinal axis of the outer shell member 28. As in the case of the inner shell member 26, a pair of laterally spaced sidewalls 72 and 74 are provided, the front vertical edges of which are joined to a generally upstanding front wall 76. A flange 78, of a similar shape and design as the flange 42 formed with the inner shell member 26, is integrally molded to the peripheral edge of the outer shell member 28 and includes flange sections 80, 82 along each sidewall 72 and 74 as well as flange sections 84 and 86 along the rear wall 68 and the front wall 76, respectively. Thus, complementary mating surfaces are provided by the flanges 42 and 78 which, as seen in FIGS. 3 and 4, overlap and permit the inner and outer shell members 26 and 28 to be fixedly joined together to provide a unitary seat structure. Crossbars 88 are also formed with the flange 78 and extend between the flange sections 80 and 82 formed with the sidewalls 72 and 74 so as to serve as handle means together with the crossbars 54 when assembled therewith.

In the manufacture of the baby seat 10 described above, both the inner shell member 26 and the outer shell member 28 are molded separately from a plastic material. Subsequently, the inner shell member 26 is fitted into the outer shell member 28 after which the flanges 42 and 78 of the respective members are joined together through a heat-sealing process or other means such as mechanical fasteners. When the two shell members are joined together, the seat portion 29 of the inner shell member 26 is located in a transverse plane which will intersect the plane of the front wall 76 and the plane of the base portion 66 at substantially equal angles.

As should be apparent from the drawings, the back portion 30 of the inner shell member 26 lies in a plane which is substantially normal to the plane of the seat portion 29 and is inclined rearwardly so that when the baby is placed into the inner shell member 26, the baby rests in a reclined position and is restrained from movement by the shoulder belt 58 incorporated with the inner shell member 26. The base portion 66 of the outer shell member 28 extends the full width of the inner shell member 26 and is of a longitudinal length which is coextensive with the entire seat portion 29 as well as approximately 50 percent of the back portion 30 when the baby seat 10 is assembled as seen in FIG. 3. As a result, when the baby seat 10 is placed on a flat surface, the baby seat will not tend to tilt laterally nor fore and aft due to the normal activity of a baby.

As alluded to hereinbefore, the crossbars 54 and 88 integrally formed with the baby seat 10 serve as handle-type gripping means permitting the baby seat to be raised as a unit and moved from one place to another. Moreover, the triangular opening defined by the crossbars and the sidewalls of the inner and outer shell members serve as passages through which the opposite ends of the vehicle seat belt extends for holding the baby seat in position when located in a motor vehicle. As seen in FIG. 1, the rear end of the baby seat 10 is intended to be located toward the front of the vehicle so that the baby faces rearwardly. As a result, during any sudden deceleration of the vehicle, the baby seat will maintain the position shown in FIG. 1 and cause the weight of the baby to be applied along the back portion 30 of the inner shell member 26.

Various changes and modifications can be made in this construction without departing from the spirit of the invention. Such changes and modifications are contemplated by the inventor and he does not wish to be limited except by the scope of the appended claims.

I claim:

1. A baby seat adapted to be supported by the seat cushion of a vehicle seat and held thereon by a seatbelt, said baby seat including an outer shell member and an inner shell member both of which are formed of a plastic material, said inner shell member being located within said outer shell member and comprising a back portion, a seat portion and a pair of laterally spaced generally V-shaped side portions for supporting a baby, said outer shell member having a generally rectangular base portion for resting on said seat cushion in a horizontal plane, an inclined rear wall formed with the rear of the base portion, an upstanding front wall connected with the front of said base portion, a pair of laterally spaced generally V-shaped sidewalls rigidly interconnecting said base portion, the front wall, and said rear wall, outwardly projecting flange means formed along the circumference of each of said inner and outer shell members, said flange means being complementary in form and serving to rigidly join said inner and outer shell members so as to form a unitary structure wherein said back portion of the inner shell member is located adjacent the rear wall of the outer shell member and the plane of the seat portion of the inner shell member forms substantially equal included angles with the front wall and the base portion of the outer shell member, and a crossbar connected to said flange means along each side of said baby seat and serving as a handle for manually moving the baby seat from one location to another, said crossbar and a portion of said flange means defining an opening adjacent each side of the baby seat for accommodating said seatbelt.

2. The baby seat of claim 1 wherein said inner shell member includes a shoulder belt extending between a pair of apertures formed in the back portion and the flange means located along the front wall of the outer shell member.

3. A baby seat adapted to be supported in a rearwardly facing direction on the seat cushion of a vehicle seat and held thereon by a seatbelt, said baby seat including an outer shell member and an inner shell member both of which are integrally formed of a plastic material, said inner shell member being supported by said outer shell member and comprising a back portion, a seat portion and a pair of laterally spaced generally V-shaped side portions for supporting a baby, a plurality of transverse ribs formed in said back portion and said seat portion and serving as cushioning means for the body contact area of the inner shell member, said outer shell member having a generally rectangular base portion for resting on said seat cushion in a horizontal plane, an inclined rear wall formed with the rear of the base portion, an upstanding transversely extending front wall connected with the front of said base portion, a pair of laterally spaced generally V-shaped sidewalls rigidly interconnecting said base portion, the front wall, and said rear wall, outwardly projecting flange means formed along the entire circumference of each of said inner and outer shell members, said flange means being complementary in form and serving to rigidly join said inner and outer shell members by a heat-sealing process so as to form a unitary structure wherein said back portion of the inner shell member is located adjacent the rear wall of the outer shell member and the plane of the seat portion of the inner shell member forms substantially equal included angles with the front wall and the base portion of the outer shell member, and a crossbar integrally formed with and connected to said flange means along each side of said baby seat and serving as a handle for manually moving the baby seat from one location to another, said crossbar and a portion of said flange means defining an opening adjacent each side of the baby seat for accommodating said seatbelt.